US009838379B1

(12) United States Patent
Bryan et al.

(10) Patent No.: US 9,838,379 B1
(45) Date of Patent: *Dec. 5, 2017

(54) SECURITY TIERING IN A MOBILE COMMUNICATION DEVICE APPLICATION FRAMEWORK

(71) Applicant: Sprint Communications Company L.P., Overland Park, KS (US)

(72) Inventors: Jeff H. Bryan, Olathe, KS (US); Christine M. Crowell, Olathe, KS (US); Bill G. McCracken, Olathe, KS (US); Roberto Murillo, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/956,243

(22) Filed: Dec. 1, 2015

(51) Int. Cl.
*G06F 15/16* (2006.01)
*H04L 29/06* (2006.01)
*H04W 8/24* (2009.01)
*H04W 12/04* (2009.01)
*H04W 12/06* (2009.01)
*H04W 76/02* (2009.01)

(52) U.S. Cl.
CPC .......... *H04L 63/0823* (2013.01); *H04L 63/06* (2013.01); *H04W 8/245* (2013.01); *H04W 12/04* (2013.01); *H04W 12/06* (2013.01); *H04W 76/02* (2013.01)

(58) Field of Classification Search
CPC .. H04L 63/0807; H04L 63/0823; G06F 21/23

USPC ........................................................ 726/10
See application file for complete search history.

(56) References Cited

U.S. PATENT DOCUMENTS

| 7,379,731 | B2 * | 5/2008 | Natsuno ................. G06F 21/10 455/412.1 |
| 9,521,504 | B1 | 12/2016 | Bryan et al. |
| 2004/0260928 | A1 * | 12/2004 | Immonen ............ H04L 63/0823 713/175 |
| 2015/0006404 | A1 * | 1/2015 | Beidl .................... H04L 63/062 705/71 |
| 2015/0117388 | A1 | 4/2015 | Liu et al. |

(Continued)

OTHER PUBLICATIONS

Bryan, Jeff H., et al., "Service Composition in a Mobile Communication Device Application Framework," filed Mar. 4, 2016, U.S. Appl. No. 15/062,041.

(Continued)

*Primary Examiner* — Evans Desrosiers

(57) ABSTRACT

A user equipment (UE) comprising a processor, a non-transitory memory, a mobile application installed in the memory, and a mobile application framework (MAF) client installed in the memory. When executed by the processor, the MAF client receives a request to access services of a MAF from the mobile application, retrieves a digital certificate associated with the mobile application, sends an application validation request comprising the certificate and an application identity to a MAF server, receives an application validation token from the MAF server, and provides the application validation token to the mobile application, whereby the mobile application is granted access to a first security tier of MAF services.

19 Claims, 7 Drawing Sheets

(56) References Cited

U.S. PATENT DOCUMENTS

2015/0223265 A1   8/2015   Fwu et al.

OTHER PUBLICATIONS

Bryan, Jeff H., et al., "Channel Selection in a Mobile Communication Device Application Framework," filed Dec. 2, 2015, U.S. Appl. No. 14/956,468.
FAIPP Pre-Interview Communication dated Jul. 5, 2016, U.S. Appl. No. 14/956,468, filed Dec. 2, 2015.
Notice of Allowance dated Aug. 8, 2016, U.S. Appl. No. 14/956,468, filed Dec. 2, 2015.

* cited by examiner

US 9,838,379 B1

SECURITY TIERING IN A MOBILE COMMUNICATION DEVICE APPLICATION FRAMEWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are becoming increasingly powerful and widely used. Many mobile devices are able to download and install mobile applications, sometimes called user applications or third party applications, after the device has been purchased and activated for mobile communication service. These mobile applications may provide some of their functionality based on communicating with application servers in the Internet. Sometimes mobile applications may provide a kind of bundled service that combines functionality from multiple third party providers.

SUMMARY

In an embodiment, a method of mobile communication is disclosed. The method comprises on-boarding a mobile application by a mobile communication network server computer system, wherein the on-boarding comprises receiving a digital certificate; generating an identification and a secret key by the server, where the digital certificate is built into the mobile application and provided to an operating system of a user equipment (UE) when the mobile application is installed on the UE and where the identification and the secret key are built into the mobile application to configure the mobile application to invoke an application programming interface (API) of a mobile application framework installed on the UE; and storing the digital certificate, the identification, and the secret key in a data store and associating the digital certificate, the identification, and the secret key with each other in the data store by the server. The method further comprises receiving an application validation request by the server from a mobile application framework client installed on a UE to validate the mobile application, wherein the application validation request comprises a digital certificate, an identification, and a secret key, validating the digital certificate, the identification, and the secret key provided in the application validation request by the server based on accessing the data store. The method further comprises, in response to successful validation of the digital certificate, the identification, and the secret key provided in the application validation request, generating by the server an application validation token, wherein the application validation token is unique to the UE on which the mobile application framework client is installed from which the application validation request was received, and transmitting the application validation token by the server to the mobile application framework client on the UE, whereby the mobile application is granted access to a first tier of mobile application framework operations.

In another embodiment, a method of mobile communication is disclosed. The method comprises receiving a first request to access services of a mobile application framework by a mobile application framework client executing on a user equipment (UE), where the first request is received via an application programming interface (API) of the client from a mobile application installed on the UE and the first request comprises an identification of the mobile application and a secret key of the mobile application and retrieving a copy of a digital certificate from an operating system of the UE by the client, where the digital certificate was provided by the mobile application to the operating system of the UE during installation of the mobile application on the UE. The method further comprises sending an application validation request to a mobile application framework server by the client, where the request comprises the copy of the digital certificate, the identification of the mobile application, and the secret key of the mobile application, and receiving an application validation token by the client from the server. The method further comprises providing the application validation token by the client to the mobile application, receiving a second request to access services of the mobile application framework by the client via the API from the mobile application, wherein the second request comprises the application validation token, and sending the second request by the client to the server, whereby the mobile application is granted access to a first security tier of mobile application framework services.

In yet another embodiment, a user equipment (UE) is disclosed. The UE comprises a processor, a non-transitory memory, a radio transceiver, a mobile application installed in the non-transitory memory, and a mobile application framework client stored in the non-transitory memory. The mobile application has been configured with a digital certificate, an application identification, and a secret key during an on-boarding process by a mobile application framework server and the mobile application provided the digital certificate to an operating system of the UE during installation of the mobile application in the non-transitory memory. When executed by the processor, the mobile application framework client receives a first request to access services of a mobile application framework from the mobile application via an application programming interface (API) of the client, where the first request comprises the application identification and the secret key, retrieves a copy of the digital certificate provided by the mobile application to the operating system from the operating system, and sends an application validation request that comprises the copy of the digital certificate, the application identification, and the secret key to the mobile application framework server. The client further receives an application validation token from the mobile application framework server, provides the application validation token to the mobile application, receives a second request to access services of the mobile application framework via the API from the mobile application, wherein the second request comprises the application validation token, and sends the second request by the client to the server, whereby the mobile application is granted access to a first security tier of mobile application framework services.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
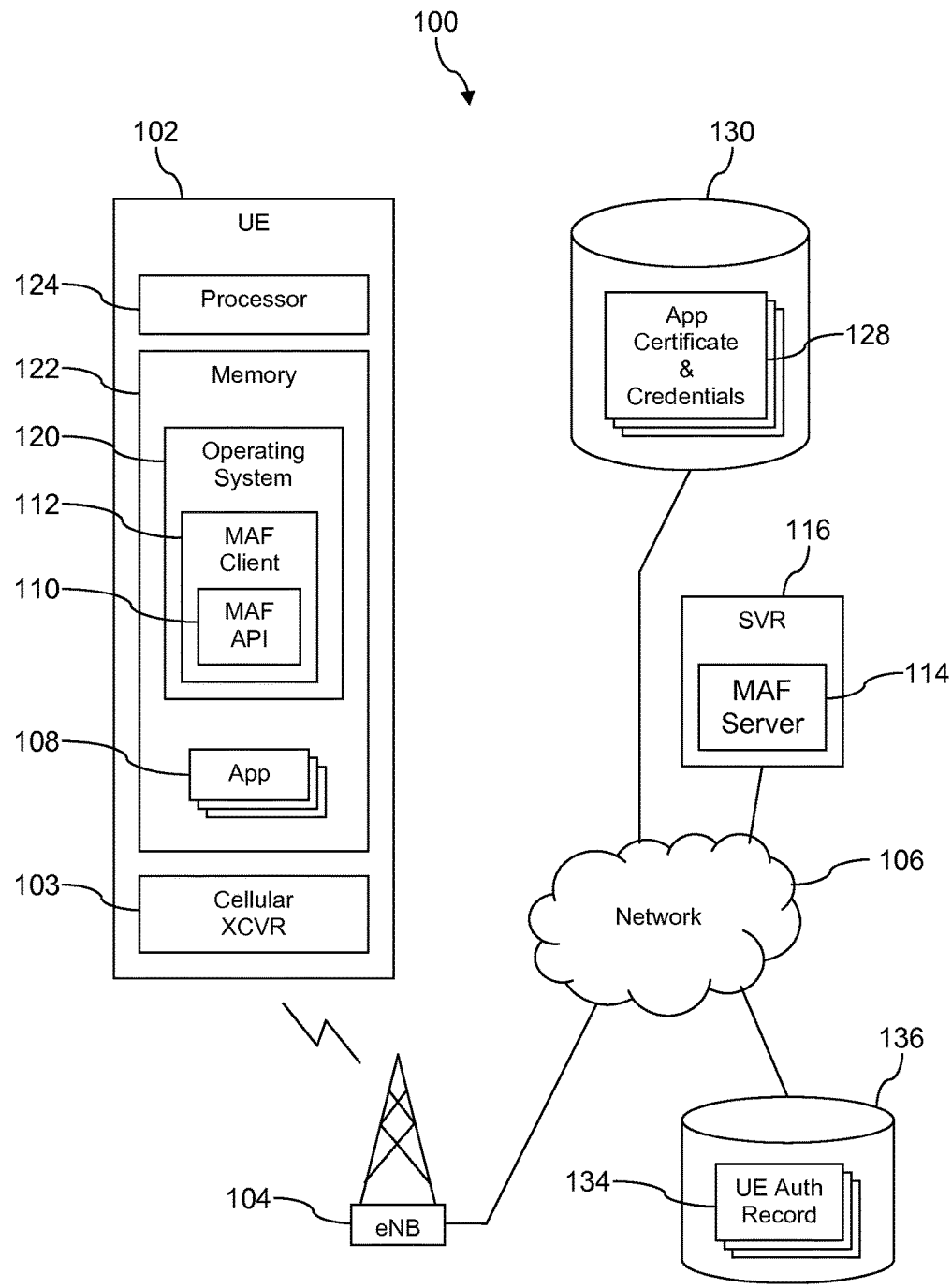
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a mobile application framework (MAF) that provides tiered layers of security for services rendered by the mobile application framework for mobile applications installed on user equipments (UEs). The UEs may be mobile communication devices such as mobile phones, smart phones, personal digital assistants, media players, wearable computers, headset computers, laptop computers, notebook computers, or tablet computers. The mobile applications may be user applications or third party applications that have been installed on the UE.

The mobile application framework provides an application programming interface (API) for mobile applications to invoke to access services provided by the framework in a uniform way. Without limitation, some of the services provided by the mobile application framework comprise one or more of validating a wireless communication service subscriber associated with the UE on which a mobile application is installed, adding or deleting a service to the subscriber's wireless service account (e.g., a service paid by adding the fee to the subscriber's bill for wireless service), adding or removing a charge to the subscriber's wireless service account, and querying subscriber wireless communication usage (e.g., overall data usage, call usage, text usage). The mobile application framework may further promote ease of bundling a service composed of services provided by multiple independent companies or service developers.

The mobile application framework comprises a mobile application framework server and a mobile application framework client that executes on UEs. Mobile applications invoke an API extended by the mobile application framework client, and the client interworks with the mobile application framework server to provide the service associated with the invoked API method. In an embodiment, the mobile application framework client may be embedded and/or encapsulated in an operating system of the UE.

Considering that some of the services offered by the mobile application framework provide access to varying levels of sensitive information, the mobile application framework implements several different tiers of security. Different tiers of security may be applied for different mobile applications and/or for different mobile application framework API method calls. For example, a higher tier of security may be applied when a mobile application requests a service of the mobile application framework to access more sensitive information. In an embodiment, each higher tier of security builds on or encapsulates the lower tiers of security within it.

When a mobile application desires to make use of the mobile application framework, it may be on-boarded by the mobile application framework server (MAF server). The developer of the mobile application may generate a digital certificate to be uniquely associated with the mobile application. During the on-boarding process, the mobile application developer provides the digital certificate of the mobile application to the MAF server, and the MAF server may generate a mobile application identity and a mobile application secret key and provides these to the developer of the mobile application. The developer builds the mobile application digital certificate, the mobile application identity, and the mobile application secret key that it was on-boarded with into the mobile application. When the mobile application is installed on a UE, the mobile application provides the mobile application digital certificate to an operating system of the UE that stores it.

When the mobile application invokes a method of the mobile application framework application programming interface (MAF API) extended by the mobile application framework client (MAF client), the mobile application includes the mobile application identity and mobile application secret key in the MAF API call. The MAF client first obtains a copy of the mobile application digital certificate stored by the operating system of the UE. The MAF client sends the mobile application identity and mobile application secret key received in the MAF API call as well as the copy of the mobile application digital certificate to the MAF server, and the MAF server searches a data store to find a record that the subject mobile application has been on-boarded. If the copy of the mobile application digital certificate, the mobile application identity, and the mobile application secret key match a record in the data store, the mobile application identity is considered validated by the mobile application framework, and the MAF server sends an application identity validation success indication to the MAF client.

This first tier of MAF security may be referred to as application identity validation. Application identity validation by itself may suffice for some limited methods of the MAF API extended by the MAF client. The MAF server may generate an application validation token, store a copy of the application validation token locally (e.g., on the MAF server or in a data store associated with the MAF server), and return the application validation token to the MAF client. The MAF client returns the application validation token to the mobile application. On further calls to the MAF API the mobile application may send the application validation token in lieu of completing the application identity validation process. This application validation token may have a time to live value build into it such that the mobile application may be requested to repeat the full mobile application identity validation process after expiration of the token's time to live.

Other API methods of the MAF API may entail validating a UE identity. In this case, the MAF client may request network authentication of the UE from a service provider. The MAF client may send a UE specific identity (e.g., a mobile equipment identity (MEID), an electronic serial number (ESN), or other device identifier) to the wireless network and receives a network token in return if the UE successfully authenticates. The network authentication may be performed using carrier-grade authentication. The network authentication may be performed, for example, using an extensible authentication protocol (EAP) method or using an extensible authentication protocol authentication and key agreement (EAP-AKA) method. As part of the network authentication, the MAF client may provide further information to the wireless communication network element from a subscriber identity module (SIM) or a universal integrated circuit card (UICC) installed into or encapsulated in the UE. In an embodiment, some of the information provided to the wireless network by the MAF client may be hashed and/or encrypted using secret keys stored in both the wireless network (e.g., stored in a data store maintained by a wireless communication service provider indexed by a subscriber identity or other identifying information) and in the SIM or UICC on the UE.

The MAF client may send the application validation token, the network token, and a request to validate the UE to the MAF server. The MAF server confirms the application validation token is valid by comparing it to the copy of the application validation token stored when the token was generated by the MAF server. The MAF server confirms the network token is valid by accessing a data store in the wireless service provider network, and then further obtains an identity of the wireless communication service subscriber associated with the UE. If the validation actions succeed, the MAF server generates a UE validation token, stores a copy of the UE validation token, and returns that along with the subscriber identity to the MAF client. The MAF client may then grant access of the mobile application to the MAF API method that was requested. The UE validation token may be built with a time to live, and the MAF client may store the UE validation token and use that in lieu of performing the UE identity validation process during future calls to the MAF API methods by the same mobile application.

In an embodiment, the network identity can be used for further security in the mobile application framework. For example, a mobile application may execute a 'get usage' API method and specify an identity of a subscriber or UE. The MAF server can again look-up the network token—even though the UE validation token has been provided by the MAF client in providing the API method call—and compare associated information with the parameters or arguments provided by the mobile application in the 'get usage' API call. This may prevent an otherwise validated and/or authenticated mobile application requesting data inappropriately, for example requesting usage data for a subscriber or UE not associated with the UE making the request.

Yet other API methods of the MAF API may entail validating a subscriber identity. For example, MAF API methods that engage a subscriber to pay fees may entail validating the subscriber identity. This may involve popping up a dialog box on the display of the UE and asking the subscriber to enter some private information. This could be a personal identification number (PIN) as well as other private information. The MAF client sends the application validation token, the UE validation token, and the private information back to the MAF server. The MAF server validates the application validation token against the stored application validation token, validates the UE validation token against the stored UE validation token, and validates the private information against a record that associates the private information to the subscriber. It is noted that this validation of private information is done back in the network, on the MAF server, versus directly by the MAF client, for considerations of information security. If the application validation token, the UE identity token, and the secret information are successfully validated, the MAF client is informed, and the MAF client allows the mobile application to perform the subject MAF API method.

In an embodiment, at the time that the subscriber inputs his or her secret information to perform subscriber validation, the dialog box may invite the subscriber to provide a shortcut identification signature such as a fingerprint, a face scan, a voice scan, or other identification. The subject identification shortcut information may be stored back in the network in a data store by the MAF server for use in future subscriber validations. The MAF client may restrict the process of configuring a biometric shortcut to circumstances under which it can be sure it is the subscriber who is controlling the UE at that time. This may be the case, for example, when a lock is configured for the UE. Thus, if the UE is unlocked, it is in the presumed control of the subscriber.

The stratification of mobile application framework security into tiered layers promotes "right-sized" processing overhead and delays adapted to the sensitivity of information requested from the mobile application framework services. The multi-tiered security contributes to the uniformity and consistency of the API extended by the MAF client to the mobile applications. It contributes to decoupling the design and operation of the mobile application framework from the individual mobile applications which may be developed by any third parties, perform any operations, and access any services of the mobile application framework, so long as they complete the on-boarding process and abide by the API extended by the MAF client. This decoupling may encourage third party developers to build and deploy mobile applications that rely on the mobile application framework, building value and customer satisfaction for the UE and the mobile communication service that provides communication service to the UE. It is noted that some mobile applications may be rejected for on-boarding, for example when the purpose or content of a mobile application is contrary to the values of the operator of the mobile application framework or when the developer of the mobile application competes with the operator of the mobile application framework or for other reasons.

Turning now to FIG. 1, a system 100 is described. In an embodiment, system 100 comprises a user equipment (UE) 102, an enhanced node B (eNB) 104 or cell tower, a communication network 106, and one or more mobile applications 108 installed on the UE 102. The UE 102 may be a mobile communication device such as a mobile phone, a smart phone, a personal digital assistant (PDA), a media player, a wearable computer, a headset computer, a laptop computer, a tablet computer, or a notebook computer. The network 106 may comprise one or more public networks, one or more private networks, or a combination thereof. One or more of the mobile applications 108 may be installed by an original equipment manufacturer (OEM) of the UE 102. One or more of the mobile applications 108 may be installed after the UE 102 has been delivered to a subscriber and activated. The mobile applications 108 may be developed by third party application developers.

The UE 102 further comprises a cellular transceiver 103 which provides wireless communication links between the UE 102 and the eNB 104. The cellular transceiver 103 may communicate with the eNB 104 according to one or more of a long term evolution (LTE) wireless protocol, a code division multiple access (CDMA) wireless protocol, a global system for mobile communication (GSM) wireless protocol, a worldwide interoperability for microwave access (WiMAX) wireless protocol, or other wireless communication protocol. The UE 102 comprises a processor 124 and a memory 122. The memory 122 comprises a mobile application framework (MAF) client 112 that provides a MAF application programming interface (API) 110. In an embodiment, the MAF client 112 is embedded or encapsulated in an operating system 120 of the UE 102. In another application, however, the MAF client 112 is not embedded in the operating system and is an application stored in a system partition of the memory 122 or, alternately, in a carrier partition of the memory 122.

It is understood that the system 100 may comprise any number of UEs 102 and any number of eNBs 104. Likewise, any number of mobile applications 108 may be installed on the UE 102, and different numbers of mobile applications 108 and different specific mobile applications 108 may be installed on different UEs 102.

When a mobile application is planned to make use of services provided by the mobile application framework supported by the MAF client 112 and a MAF server 114 that executes on a server computer 116 (e.g., the MAF server 114 is an application that provides server functionality through being executed on the server computer 116), a process of "on-boarding" the mobile application 108 is performed by a developer, administrator, or technician associated with the development of the mobile application 108. The on-boarding is completed before the mobile application is released for installation on the UEs 102. The developer, administrator, or technician (hereinafter simply referred to as developer) associated with the mobile application builds or creates an application digital certificate to be uniquely associated with the subject mobile application 108. The developer provides this application digital certificate to the MAF server 114 and further requests a mobile application identity and a secret key from the MAF server 114. The MAF server 114 generates the mobile application identity and secret key and provides them to the developer. The developer builds the application digital certificate, the mobile application identity, and the secret key into the mobile application 108. The MAF server 114 stores the on-boarding artifacts (i.e., the digital certificate, the mobile application identity, and the secret key) as credentials 128 in a data store 130. It is noted that a single mobile application 108, although possibly installed on many UEs 102, is associated with a single set of credentials 128.

When a mobile application 108 is installed on the UE 102, it provides its application digital certificate to the operating system 120 which stores the application digital certificate. When the mobile application 108 first requests access to the mobile application framework by invoking a method of the MAF API 110, it provides the mobile application identity and secret key that the MAF server 114 allocated to it during "on-boarding." In response to the method invocation of the MAF API 110, the MAF client 112 looks up the application digital certificate associated with the calling mobile application 108. The MAF client 112 sends a request for service, based on the API method call invoked by the mobile application 108, to the MAF server 114. This request includes the application digital certificate, the mobile application identity, and the secret key.

This request for service may be referred to as a mobile application validation request in some contexts, since the service request engages the mobile application identity validation process, the first tier of mobile application framework security. In an embodiment, the service request and mobile application validation request may comprise the same request or message. In another embodiment, however, the MAF client 112 may send a mobile application validation request to the MAF server 114 and complete the mobile application identity validation process first and then, if the validation succeeded, send the service request in a second, subsequent message.

The MAF server 114 searches for credentials 128 in the data store 130 that match those provided in the request received from the MAF client 112. If the credentials are determined to be valid (e.g., match credentials 128 stored in the data store 130), the MAF server 114 generates an application validation token and sends this to the MAF client 112. In an embodiment, the MAF server 114 may send a mobile application validation success message or indication to the MAF client 112, or it may be that the sending of the application validation token itself signals the success of the application identity validation request. The MAF server 114 may store a copy of the application validation token in a data store, for example in the data store 130.

When it receives the application validation token, the MAF client 112 may perform the service requested by the MAF API 110 method call or it may first perform additional tiers of security processing, as discussed further below. Alternatively, the MAF client 112 may send a service request message to the MAF server 114, and the MAF server 114 may perform the requested service and return to the MAF client 112 data or an acknowledgment to be forwarded to the mobile application 108. As mentioned above, in an embodiment, the request for mobile application identity validation may be combined with or implied by the service request and may not actually comprise a separate message or request.

The MAF client 112 provides the application validation token to the mobile application 108 which stores it for presenting in future MAF API 110 method invocations. Thus, the mobile application 108, when invoking a MAF API 110 method, provides not the mobile application identity and secret key but the more convenient application validation token. The application validation token may be built with a time to live value that makes the token expire after a predefined period of time. When this happens, the MAF client 112 rejects the MAF API 110 method invocation containing the expired application validation token, and the mobile application 108 performs the full application validation process. The validation of the mobile application 108 may be referred to as a first tier of mobile application framework security. It is understood that different mobile applications 108 installed on the same UE 102 would perform the mobile application validation process independently and each mobile application 108 would each be associated with its own application validation token.

A second tier of mobile application framework security is based on validating the UE 102. When the MAF client 112 receives a method call on the MAF API 110 that entails UE validation (and assuming UE validation has not been completed before and a UE validation token as described below is not stored by the MAF client 112), it first sends a request to a wireless communication network element (not shown)

(e.g., a host computer or a server) to authenticate the UE 102. In support of this request, the MAF client 112 sends a mobile equipment identity (MEID), an electronic serial number (ESN), or other identification of the UE 102. MAF client 112 may provide further information to the wireless communication network element from a subscriber identity module (SIM) or a universal integrated circuit card (UICC) installed into or encapsulated in the UE 102. Some of the information provided to the wireless network by the MAF client 112 may be hashed and/or encrypted using secret keys stored in both the wireless network (e.g., stored in a data store maintained by a wireless communication service provider indexed by a subscriber identity or other identifying information) and in the SIM or UICC on the UE 102.

The network element attempts to authenticate the UE 102 based on the provided information, for example using carrier-grade authentication such as using an extensible authentication protocol authentication and key agreement (EAP-AKA) method. If the UE 102 is activated for service in the subject wireless communication network, the network element returns a network authentication token to the MAF client 112. The network element may store a copy of the network authentication token in a data store, for example as a UE authentication record 134 in a network data store 136. The MAF client 112 sends a UE validation request to the MAF server 114 that comprises the application validation token (which may have been provided in the MAF API 110 method call) and the network authentication token.

The MAF server 114 validates the application validation token. The MAF server 114 also communicates with the wireless communication network element to validate the network authentication token. The network element may validate the network authentication token by looking the UE authentication record 134 in the network data store 136 and comparing the network authentication token to the UE authentication record 134 or in analyzing the network authentication token based on the UE authentication record 134. If the network element validates the network authentication token, it may return an identity of a subscriber associated with the UE 102 (e.g., a name such as "Julius Caesar"). The MAF server 114 builds a UE validation token and sends this UE validation token along with the identity of the subscriber back to the MAF client 112. The MAF client 112 stores the subscriber identity and the UE validation token for future use. The UE validation token can be used by the MAF client 112 to support mobile application framework service requests from different mobile applications 108 installed on the same UE 102.

In an embodiment, the UE validation token has a time to live value built into it. The time to live value of the UE validation token may be different from the time to live value that is built into the application validation token. This may be referred to as UE validation and is the second tier of mobile application framework security. The MAF client 112 may then perform the service requested by the MAF API 110 method call or it may first perform additional tier of security processing as discussed further below. Alternatively the MAF client 112 may send a service request to the MAF server 114, and the MAF server 114 may perform the requested service and return to the MAF client 112 data or an acknowledgement to be forwarded to the mobile application 108. As mentioned above, in an embodiment, the request for UE validation may be combined with or implied by the service request and may not actually comprise a separate message or request.

A third tier of mobile application framework security is based on validating the subscriber of the UE 102. When the MAF client 112 receives a method call on the MAF API 110 that entails subscriber validation, the MAF client 112 pops up a dialog box on a display of the UE 102 that prompts the user to enter private information such as a personal identification number (PIN) or other private information that would authenticate that the person using the UE 102 is in fact the subscriber rather than a family member, a co-worker, or a stranger. The dialog box may further identify the mobile application 108 that is currently requesting the service from the mobile application framework that depends on the subscriber validation. The dialog box may further identify the service requested by the mobile application 108.

When the subscriber has input the requested private information, the MAF client 112 then sends a subscriber validation request to the MAF server 114 that comprises the application validation token (which may have been provided in the MAF API 110 method call), the UE validation token that the MAF client 112 may have stored, and the private information input by the subscriber. The MAF server 114 validates the application validation token, validates the UE validation token, and validates the private information. The private information may be pre-configured in the data store 130. The MAF server 114 then sends a message to the MAF client 112 indicating that the subscriber has been validated. The MAF client 112 may then perform the service requested by the MAF API 110 method call. In an embodiment, the requested service may be performed by the MAF server 114 and the MAF server 114 may return a confirmation of the service being performed or a result of the service being performed to the MAF client 112. Depending on the MAF API 110 method that was involved, the MAF client 112 may return results or confirmation of completion of the operation to the mobile application 108 may be referred to as subscriber validation and is the third tier of mobile application framework security.

In an embodiment, when the subscriber is asked to input private information into the dialog box during subscriber validation, he or she may be invited at the same time by the dialog box to create and store a biometric shortcut on the UE 102 (e.g., in the MAF client 112). The biometric shortcut may be a fingerprint scan captured by a camera, electro-optical scanner, or other input device of the UE 102, a face scan captured by a camera of the UE 102, a voice scan captured by a microphone of the UE 102, or another biometric signature of the subscriber captured using any input device of the UE 102. When the subscriber has input the biometric signature, the MAF client 112 may transmit it to the MAF server 114 for storage in association with the subscriber private information, for example storing the biometric signature in associated with the subscriber private information in the network data store 136.

The MAF client 112 may restrict offering the shortcut configuring process to when the UE 102 is in a locked mode. As used herein, a UE 102 is in a locked mode when a lock key or PIN has been defined for the UE 102 and the UE 102 is configured to transition to the locked mode after a relatively short time duration of inactivity (for example one minute of inactivity, two minutes of inactivity, five minutes of inactivity, or 10 minutes of inactivity). Thus, the locked mode promotes preventing someone other than the subscriber operating the UE 102, as the lock will activate after the timeout and only the subscriber knows the key to remove the lock.

In the future, when any of the mobile applications 108 invoke a method on the MAF API 110 that entails the third tier of security, if a biometric shortcut is configured, the MAF client 112 may receive an input of the biometric, encode the biometric signature, and send it to the MAF server 114 in lieu of the subscriber's private information. The MAF server 114 may look-up the association of the subscriber's private information to the biometric signature to validate the subscriber. In some contexts this may be referred to as a fourth tier of mobile application framework security. Alternatively, this may be conceived of as an alternative implementation of the subscriber validation process and hence an alternative process for providing the third tier of mobile application framework security.

Figure 2:
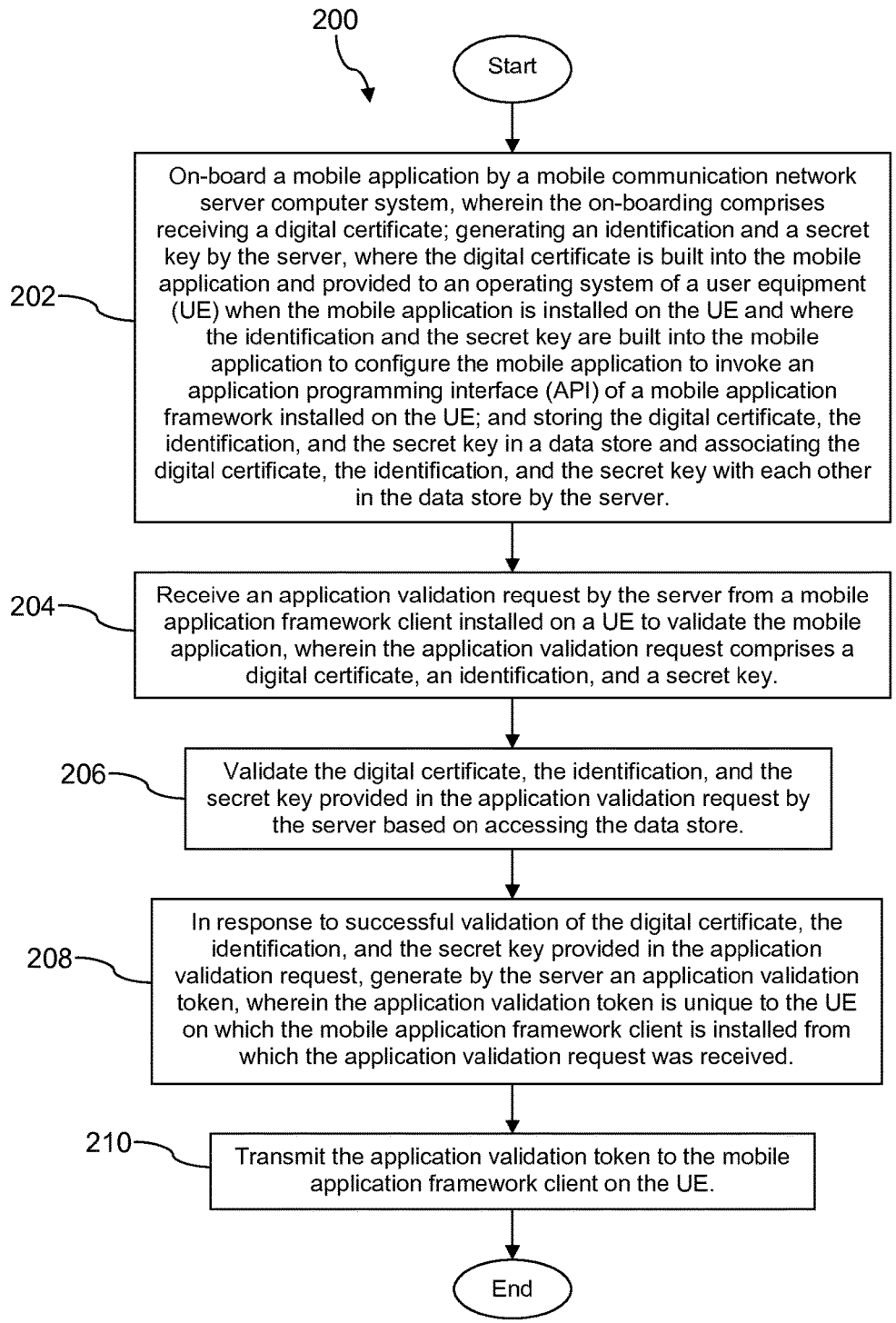
FIG. 2 is a flow chart of a method according to an embodiment of the disclosure.

Turning now to FIG. 2, a method 200 is described. At block 202, on-board a mobile application by a mobile communication network server computer system, wherein the on-boarding comprises receiving a digital certificate; generating an identification, and a secret key by the server, where the digital certificate is built into the mobile application and provided to an operating system of a user equipment (UE) when the mobile application is installed on the UE and where the identification and the secret key are built into the mobile application to configure the mobile application to invoke an application programming interface (API) of a mobile application framework installed on the UE; and storing the digital certificate, the identification, and the secret key in a data store and associating the digital certificate, the identification, and the secret key with each other in the data store by the server. In an embodiment, the developer of the mobile application 108 generates the digital certificate and provides it during the on-boarding process. The identification may be the mobile application identity described above with reference to FIG. 1.

At block 204, receive an application validation request by the server from a mobile application framework client installed on a UE to validate the mobile application, wherein the application validation request comprises a digital certificate, an identification, and a secret key. At block 206, validate the digital certificate, the identification, and the secret key provided in the application validation request by the server based on accessing the data store. At block 208, in response to successful validation of the digital certificate, the identification, and the secret key provided in the application validation request, generate by the server an application validation token, wherein the application validation token is unique to the UE on which the mobile application framework client is installed from which the application validation request was received. At block 210, transmit the application validation token to the mobile application framework client on the UE.

Figure 3:
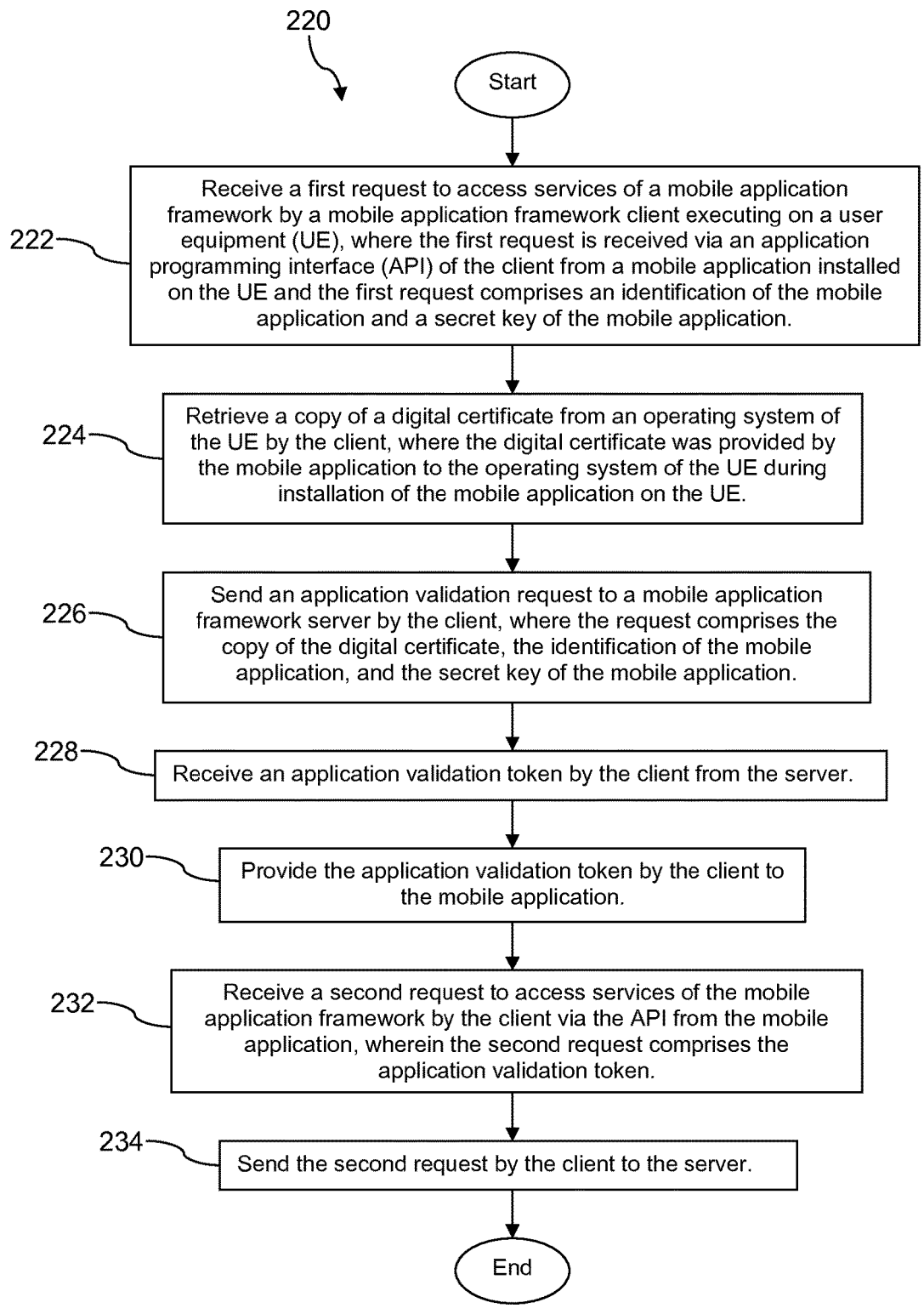
FIG. 3 is a flow chart of another method according to an embodiment of the disclosure.

Turning now to FIG. 3, a method 220 is described. At block 222, receive a first request to access services of a mobile application framework by a mobile application framework client executing on a user equipment (UE), where the first request is received via an application programming interface (API) of the client from a mobile application installed on the UE and the first request comprises an identification of the mobile application and a secret key of the mobile application. At block 224, retrieve a copy of a digital certificate from an operating system of the UE by the client, where the digital certificate was provided by the mobile application to the operating system of the UE during installation of the mobile application on the UE. At block 226, send an application validation request to a mobile application framework server by the client, where the request comprises the copy of the digital certificate, the identification of the mobile application, and the secret key of the mobile application. At block 228, receive an application validation token by the client from the server. At block 230, provide the application validation token by the client to the mobile application. At block 232, receive a second request to access services of the mobile application framework by the client via the API from the mobile application, wherein the second request comprises the application validation token. At block 234, send the second request by the client to the server.

Figure 4:
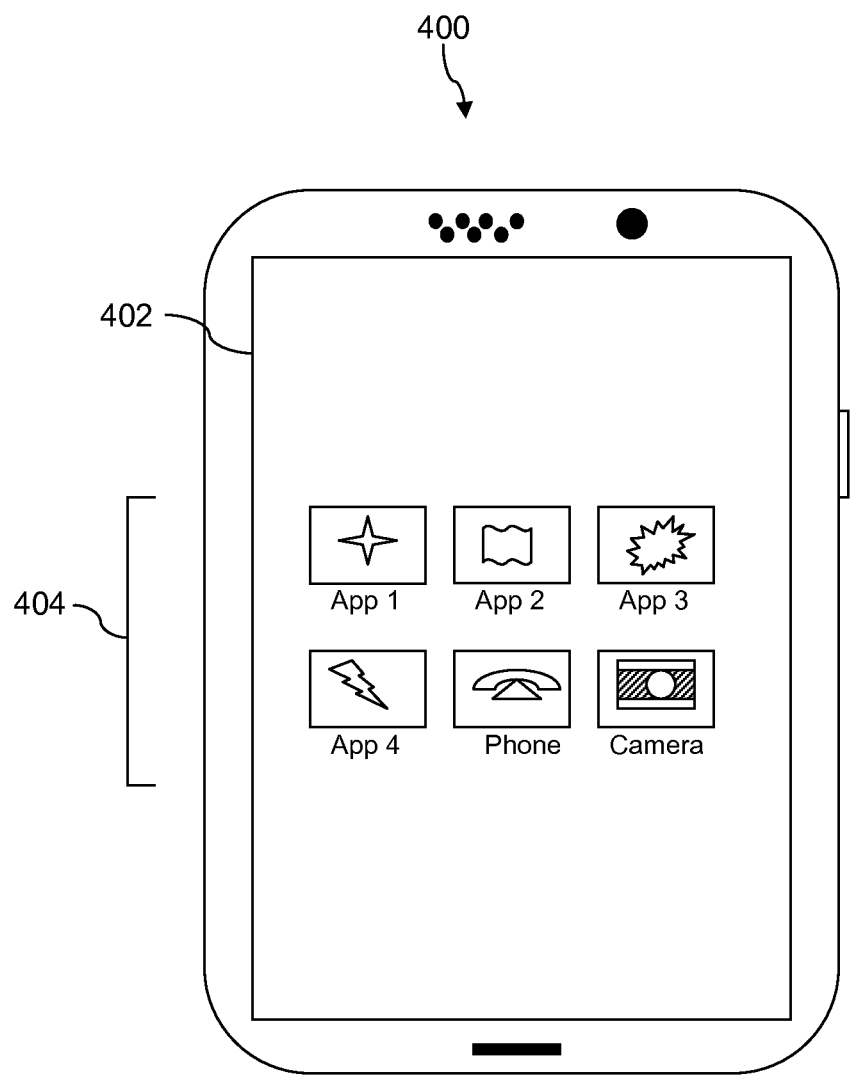
FIG. 4 is an illustration of a user equipment according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
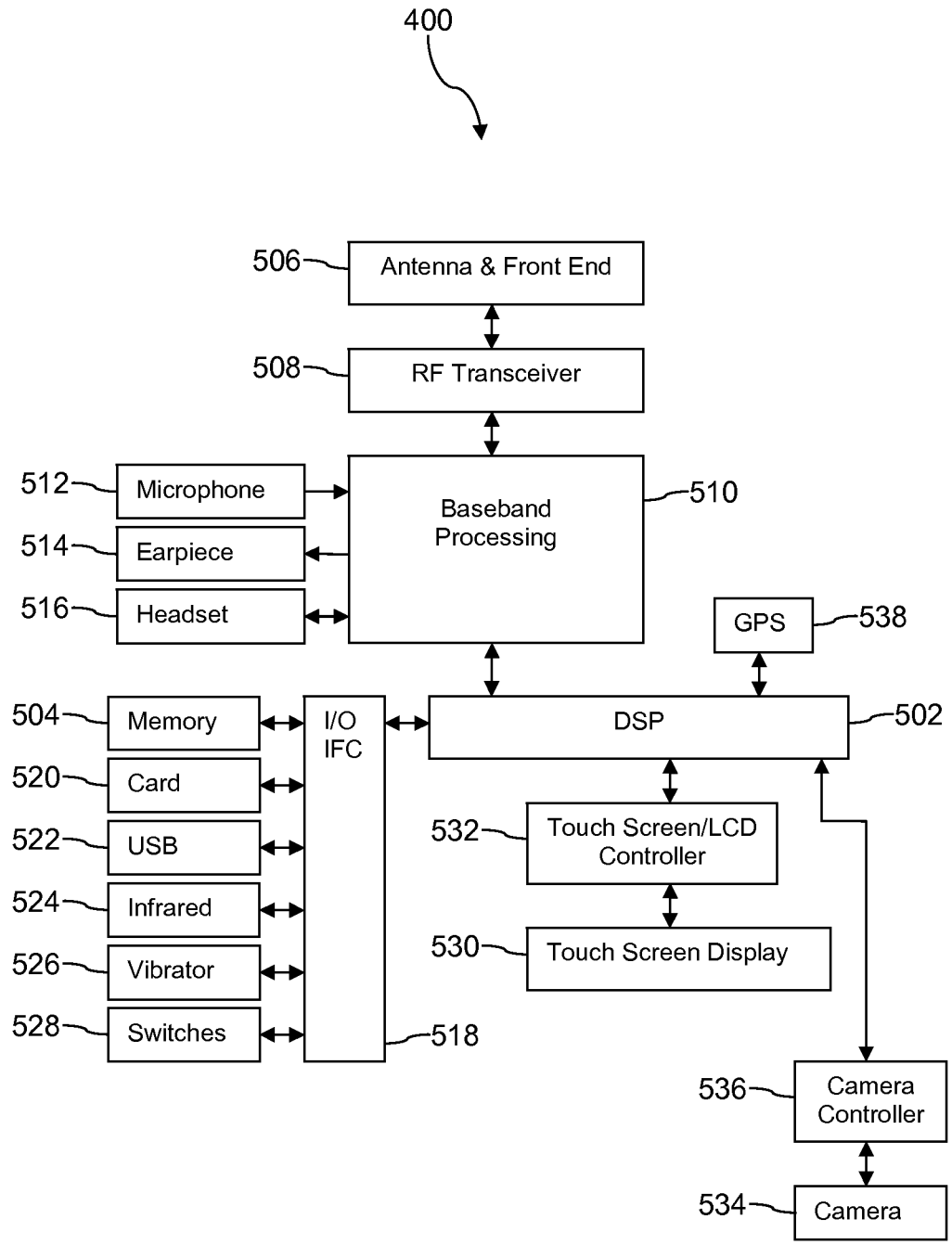
FIG. 5 is a block diagram of a user equipment according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
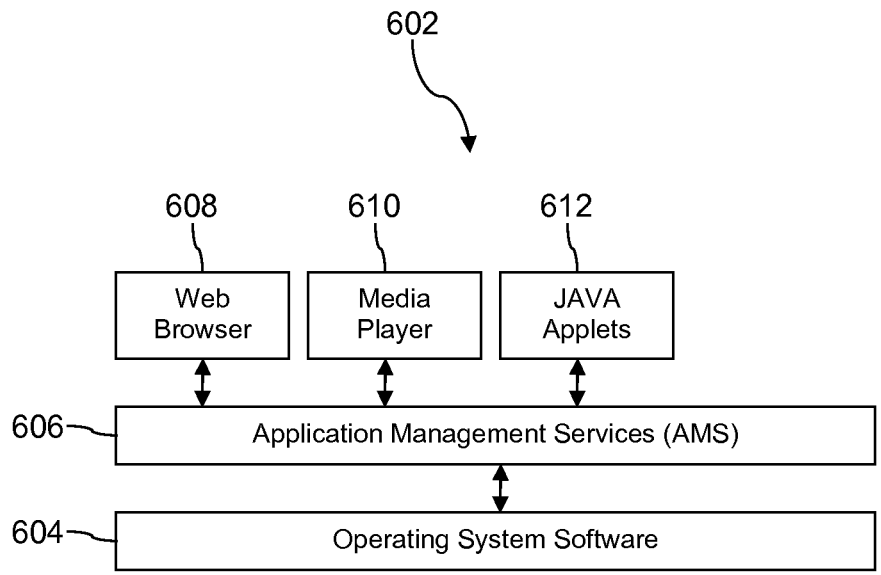
FIG. 6A is a block diagram of a software architecture of a user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
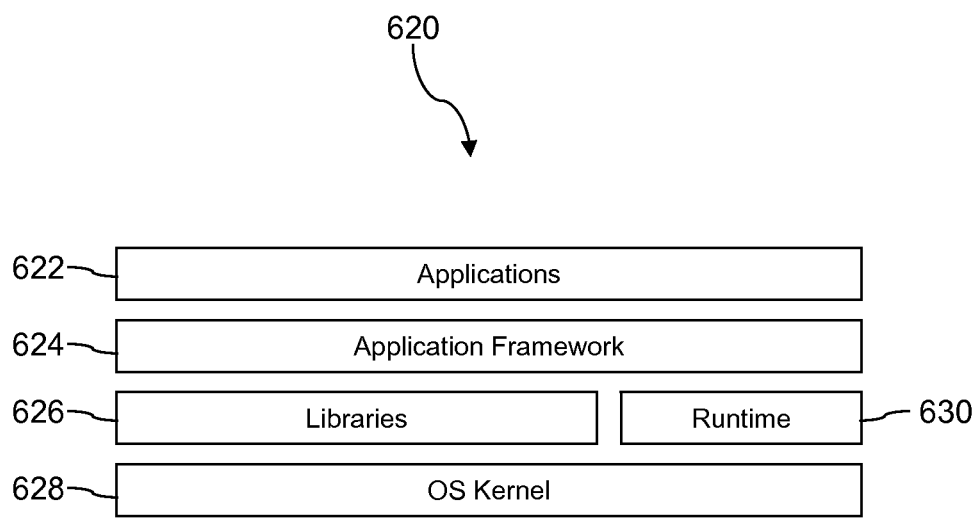
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
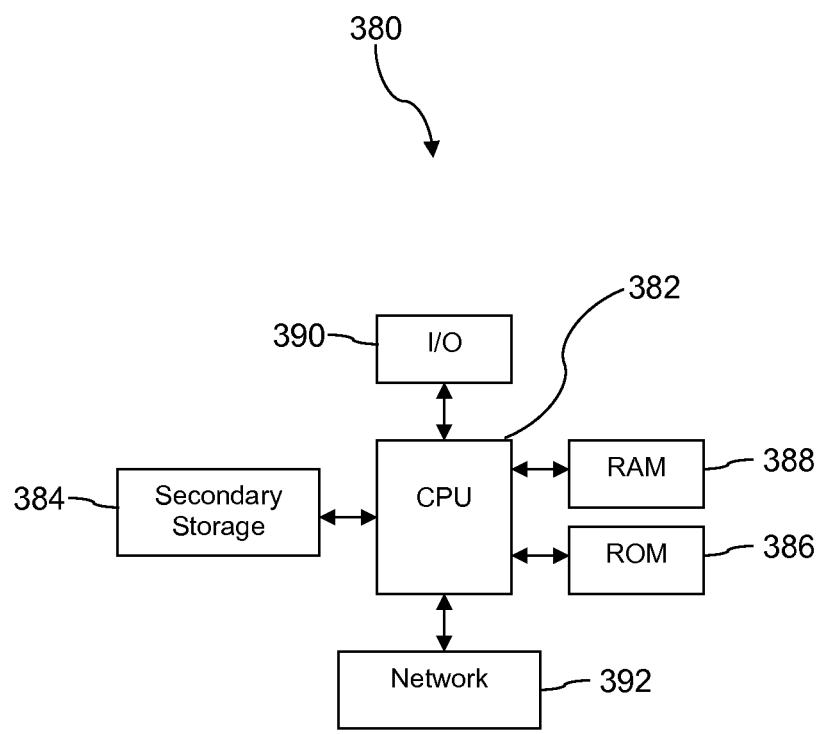
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of mobile communication, comprising:
   on-boarding a mobile application by a mobile communication network server computer system, wherein the on-boarding comprises:
      receiving a digital certificate,
      generating an identification and a secret key by the server, where the digital certificate is built into the mobile application and provided to an operating system of a user equipment (UE) when the mobile application is installed on the UE and where the identification and the secret key are built into the mobile application to configure the mobile application to invoke an application programming interface (API) of a mobile application framework installed on the UE, and
      storing the digital certificate, the identification, and the secret key in a data store and associating the digital certificate, the identification, and the secret key with each other in the data store by the server;
   receiving an application validation request by the server from a mobile application framework client installed on the UE to validate the mobile application, wherein the application validation request comprises a digital certificate, an identification, and a secret key;
   validating the digital certificate, the identification, and the secret key provided in the application validation request by the server based on accessing the data store;
   in response to successful validation of the digital certificate, the identification, and the secret key provided in the application validation request, generating by the server an application validation token, wherein the application validation token comprises a time to live value is unique to the UE on which the mobile application framework client is installed from which the application validation request was received, and wherein the application validation token is validated based at least in part on assuring that the time to live value has not been exceeded; and
   transmitting the application validation token by the server to the mobile application framework client on the UE, whereby the mobile application is granted access to a first tier of mobile application framework operations.

2. The method of claim 1, wherein validating the digital certificate, the identification, and the secret key provided in the application validation request comprises retrieving the stored digital certificate, the stored identification, and the stored secret key from the data store and comparing it to the digital certificate, the identification, and the secret key received in the application validation request.

3. The method of claim 1, further comprising:
   storing a copy of the application validation token by the server when it is generated in a data store;
   receiving a mobile application framework service request by the server from the mobile application framework client, wherein the service request comprises the application validation token;
   validating the application validation token by the server by comparing it to the stored application validation token; and
   based on validating the application validation token, performing a mobile application framework service requested by the service request.

4. The method of claim 1, further comprising:
   receiving a UE validation request by the server from the mobile application framework client installed to validate the UE, wherein the UE validation request comprises the application validation token and a network authentication token;
   validating the network authentication token by the server with a wireless communication network server;
   receiving an identity of a subscriber associated with the UE from the wireless communication network server by the sever;
   validating the application validation token by the server;
   building a UE validation token;
   storing a copy of the UE validation token by the server in a data store; and transmitting the UE validation token by the server to the mobile application framework client.

5. The method of claim 4, further comprising:
receiving a subscriber validation request by the server from the mobile application framework client, wherein the subscriber validation request comprises private information associated with the subscriber, the application validation token, and the UE validation token;
validating the application validation token;
validating the UE validation token;
validating the private information; and
sending a subscriber validation complete message by the server to the mobile application framework client.

6. The method of claim 5, wherein the UE validation token comprises a second time to live value and wherein validating the UE validation token comprises assuring that the second time to live value has not been exceeded.

7. A method of mobile communication, comprising:
receiving a first request to access services of a mobile application framework by a mobile application framework client executing on a user equipment (UE), where the first request is received via an application programming interface (API) of the client from a mobile application installed on the UE and the first request comprises an identification of the mobile application and a secret key of the mobile application;
retrieving a copy of a digital certificate from an operating system of the UE by the client, where the digital certificate was provided by the mobile application to the operating system of the UE during installation of the mobile application on the UE;
sending an application validation request to a mobile application framework server by the client, where the request comprises the copy of the digital certificate, the identification of the mobile application, and the secret key of the mobile application;
receiving an application validation token by the client from the server, wherein the application validation token comprises a time to live value, and wherein the application validation token is validated based at least in part on assuring that the time to live value has not been exceeded;
providing the application validation token by the client to the mobile application;
receiving a second request to access services of the mobile application framework by the client via the API from the mobile application, wherein the second request comprises the application validation token; and
sending the second request by the client to the server, whereby the mobile application is granted access to a first security tier of mobile application framework services.

8. The method of claim 7, further comprising:
receiving a third request to access services of the mobile application framework by the client via the API from the mobile application, wherein the third request comprises the application validation token;
sending a UE authentication request comprising an identity of the UE by the client to a wireless communication network server;
receiving a network authentication token by the client from the wireless communication network server; and
sending a UE validation request comprising the application validation token and the network authentication token to the mobile application framework server, whereby the mobile application is granted access to a second security tier of mobile application framework services.

9. The method of claim 8, wherein the network authentication token was generated by the wireless communication network server using an extensible authentication protocol authentication and key agreement (EAP-AKA) method.

10. The method of claim 8, further comprising:
receiving a UE authentication token from the mobile application server; and
storing the UE authentication token by the client on the UE.

11. The method of claim 10, wherein the UE authentication token comprises a time to live value.

12. The method of claim 11, further comprising:
receiving a fourth request to access services of the mobile application framework by the client via the API from the mobile application, wherein the third request comprises the application validation token;
presenting an input box on a display of the UE by the client that prompts for input of subscriber private information;
receiving input subscriber information by the client; and
sending a request for service based on the fourth request to the mobile application framework server by the client, where the request for service comprises the application validation token, the UE validation token, and the subscriber private information,
whereby the mobile application is granted access to a third security tier of mobile application framework services.

13. The method of claim 12, further comprising:
prompting for input of a biometric signature of a subscriber by the client;
receiving the biometric signature of the subscriber by the client; and
sending the biometric signature of the subscriber to the mobile application framework server along with the subscriber private information by the client,
whereby a biometric shortcut for accessing the third security tier of mobile application framework services is provided.

14. A user equipment (UE), comprising:
a processor;
a non-transitory memory;
a radio transceiver;
a mobile application installed in the non-transitory memory, where the mobile application has been configured with a digital certificate, an application identification, and a secret key during an on-boarding process by a mobile application framework server and the mobile application provided the digital certificate to an operating system of the UE during installation of the mobile application in the non-transitory memory; and
a mobile application framework client stored in the non-transitory memory that, when executed by the processor
receives a first request to access services of a mobile application framework from the mobile application via an application programming interface (API) of the client, where the first request comprises the application identification and the secret key,
retrieves a copy of the digital certificate provided by the mobile application to the operating system from the operating system,
sends an application validation request that comprises the copy of the digital certificate, the application identification, and the secret key to the mobile application framework server, receives an application validation token from the mobile application framework server, wherein the application validation token comprises a time to live value, and wherein the application validation token is validated based at least in part on assuring that the time to live value has not been exceeded, provides the application validation token to the mobile application, receives a second request to access services of the mobile application framework via the API from the mobile application, wherein the second request comprises the application validation token, and sends the second request by the client to the server, whereby the mobile application is granted access to a first security tier of mobile application framework services.

15. The UE of claim 14, wherein the UE is one of a mobile communication device, a mobile phone, a smart phone, a personal digital assistant (PDA), a media player, a wearable computer, a headset computer, a laptop computer, a tablet computer, or a notebook computer.

16. The UE of claim 14, wherein the radio transceiver is configured to establish a wireless communication link with a cell tower according to at least one of a long term evolution (LTE), a code division multiple access (CDMA), a global system for mobile communications (GSM), or a worldwide interoperability for microwave access (WiMAX) wireless communication protocol.

17. The UE of claim 14, wherein the mobile application framework client further:

sends a UE authentication request comprising an identity of the UE to a wireless network element, receives a network authentication token from the wireless network element, sends a UE validation request that comprises the network authentication token and the application authentication token to the mobile application framework server, receives a UE validation token, and stores the UE validation token in the non-transitory memory, whereby the mobile application is granted access to a second security tier of mobile application framework services.

18. The UE of claim 17, wherein the mobile application framework client further:

presents an input box prompting input of subscriber private information on a display of the UE, receives input of subscriber private information, and sends a subscriber validation request that comprises the subscriber private information, the UE validation token, and the application authentication token to the mobile application framework server, whereby the mobile application is granted access to a third security tier of mobile application framework services.

19. The UE of claim 17, wherein the mobile application framework client further:

presents an input box prompting input of a biometric signature on the UE, receives a biometric input, and sends a message comprising the biometric input to the mobile application framework server, whereby the mobile application framework client provides a shortcut for future validations of the subscriber based on the subscriber inputting the biometric signature to the UE.

* * * * *